United States Patent [19]

Guttmann

[11] 4,286,124

[45] Aug. 25, 1981

[54] ARRANGEMENT FOR SECURING PANELS TO A CONSOLE

[76] Inventor: Baruch Guttmann, 15 Hatanaim St., Beney Beraq, Israel

[21] Appl. No.: 58,373

[22] Filed: Jul. 17, 1979

[30] Foreign Application Priority Data

May 16, 1979 [IL] Israel ......................................... 57314

[51] Int. Cl.³ .......................... H04M 1/02; H05K 5/02
[52] U.S. Cl. ................................. 179/179; 179/100 D; 220/4 R; 312/7 R
[58] Field of Search ............... 179/179, 100 D, 100 R; 312/7 R, 7 TV; 220/324, 315, 4 R, 4 F; 455/347, 349

[56] References Cited

U.S. PATENT DOCUMENTS

| | | | |
|---|---|---|---|
| 3,521,008 | 7/1970 | Tyson | 179/179 X |
| 3,838,229 | 9/1974 | Morrell et al. | 179/100 D |
| 3,881,071 | 4/1975 | Willis et al. | 179/179 |

Primary Examiner—Thomas W. Brown
Attorney, Agent, or Firm—Browdy and Neimark

[57] ABSTRACT

Panels are secured to a body or piece of equipment, such as e.g. a desk console which comprises a base structure and covering panels. Protrusions or hook-shaped projections are provided at the panels which can be made to interengage with corresponding parts at the base. The covering panels extend at an angle relative to one another and a bar of wedge-shaped profile is inserted at the peak of the angle defined by two panels, urging the latter into firm engagement with the base.

4 Claims, 3 Drawing Figures

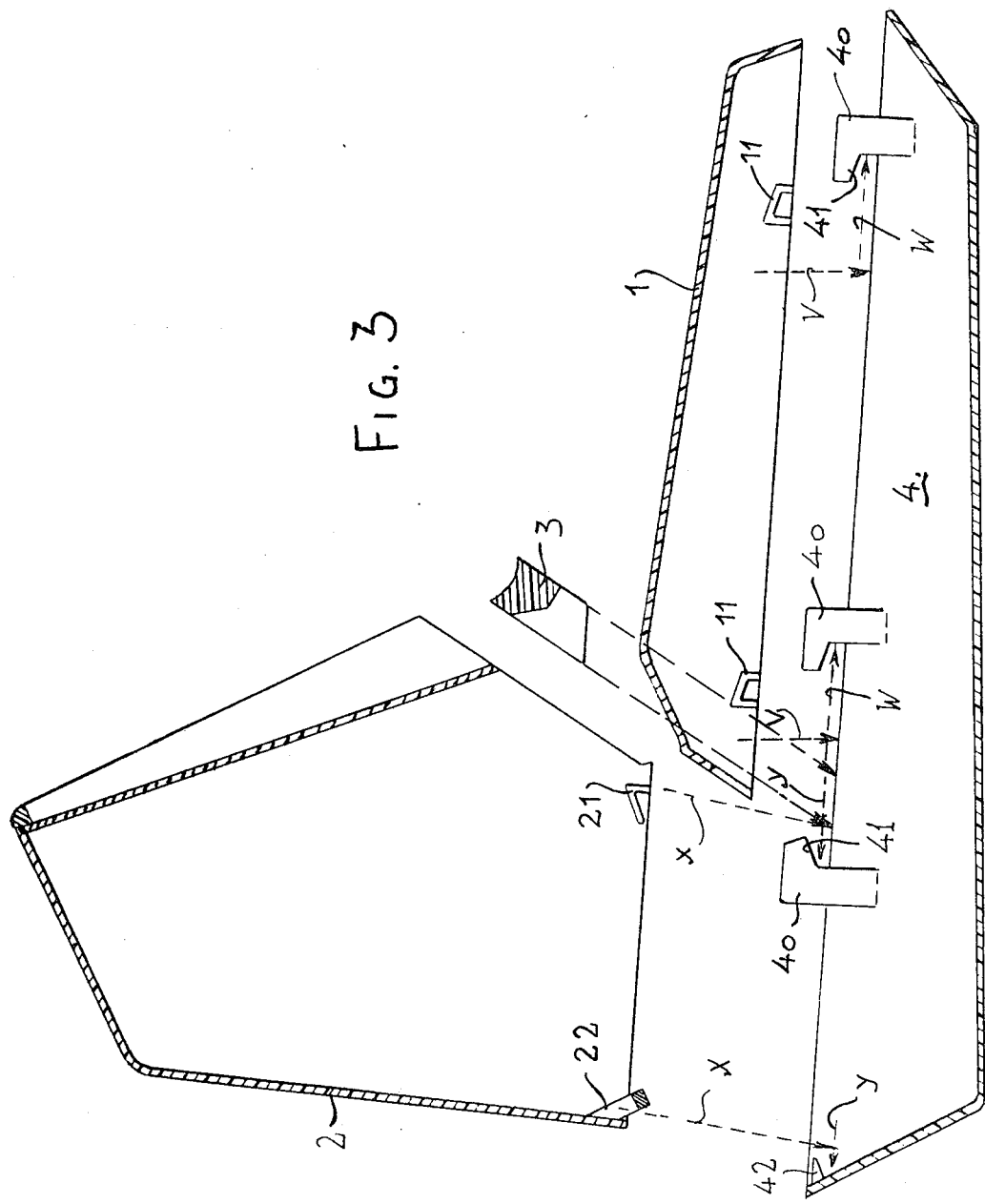

ARRANGEMENT FOR SECURING PANELS TO A CONSOLE

FIELD OF INVENTION

The present invention relates to an improved apparatus for securing a number of panels to a body on or to which they are applied and at the same time locking these panels in place against unintended displacement in relation to one another. The new improved apparatus is applicable to electrical, electronic and other devices and apparatus.

More particularly, the invention is applicable to apparatus of the console type, especially desk consoles. Desk consoles used in telecommunication systems comprise a keyboard and a display panel. The attendant uses the keyboard to effect desired connections, while the display panel indicates the made connections or calls. The keyboard and the display panel are constituted by panels extending at angular relation to one another.

BACKGROUND OF INVENTION

Various ways and techniques are known to secure the covering panels to their bases, i.e. by means of screws, rivets, snap fasteners and the like more known fastening techniques. All the known apparatus have the disadvantage that in case of repairs or when it is desired to inspect the parts beneath the covers, the latter have to be removed from the console after unscrewing or otherwise releasing the fastening members. Obviously this is a time consuming operation (in view of the fact that in case of a fault, this has to be repaired within a minimum of time). Where rivets or snap fasteners are used, these tend to become loose due to repeated removal and replacing of the panels. A further—though less serious— drawback is that the fastening members which are visible at the outside of the console detract from the aesthetic appearance of the apparatus.

OBJECTS OF INVENTION

It is the object of the present invention to provide fastening and securing members for two (or more) panels which are positioned in vicinal and angular relationship to each other, permitting the release of the panels from the body to or on which they are arranged and the repositioning of these panels, all being done without the use of tools and within a minimum of time.

SUMMARY OF THE INVENTION

According to the invention, there is provided the base structure of an apparatus which carries at least two cover panels, the base being provided with hook-like or nose-shaped projections or protrusions which are adapted to matingly interengage with corresponding parts in the base structure, an elongated, profiled member being provided which in cross section defines an angle congruent with the angle at which the two panels extend relative to one another, the elongated member being adapted to be inserted and wedged between the two panels at the peak of the angle defined by them, thus exerting pressure on the two panels urging the connecting members into mating position and so preventing disengagement of the mating fastening members.

In the application of the invention to a desk console, the base is provided with at least one pair of female or engaging members, e.g. hook-shaped brackets at the keyboard portion and at least one pair of like female members at the display portion, the cover panels for these parts of the console having engageable or male fastening members, which are adapted to be received and engaged by the female members, a bar-shaped member of a cross section to fit tightly in the angle ascribed by the cover panels being provided for insertion into the angle.

In use the cover panels are simply placed on the respective portions of the console and are made to interengage by their male fastening members with the female ones provided on the base portion, whereupon the bar member is wedged between the two cover panels.

The invention is now to be described with reference to the accompanying drawings which illustrate its application to a desk console, it being understood that this is given as an example only, it being clear that the invention is applicable in all cases where like conditions as those present with a desk console, prevail.

SHORT DESCRIPTION OF DRAWINGS

In the drawings FIG. 1 is a view of a desk console of generally conventional appearance.

FIG. 3 is an elevational, sectional view of the different parts of the console, illustrating the manner in which the parts interengage.

DESCRIPTION OF PREFERRED EMBODIMENT

Figure 1:
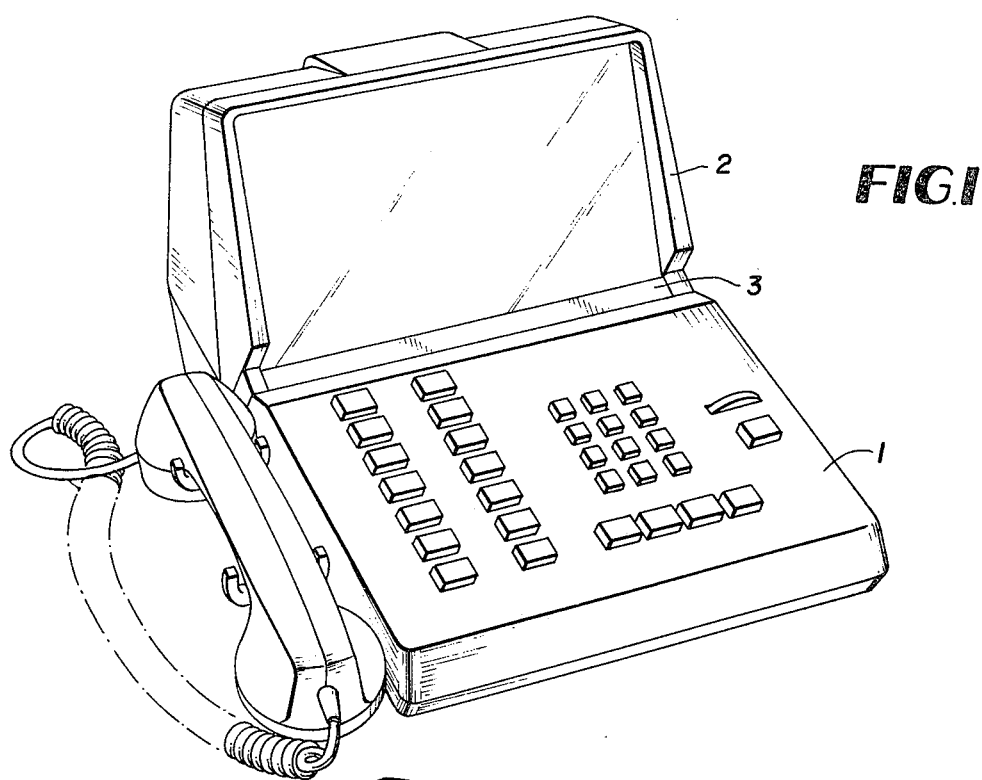
Figure 2:
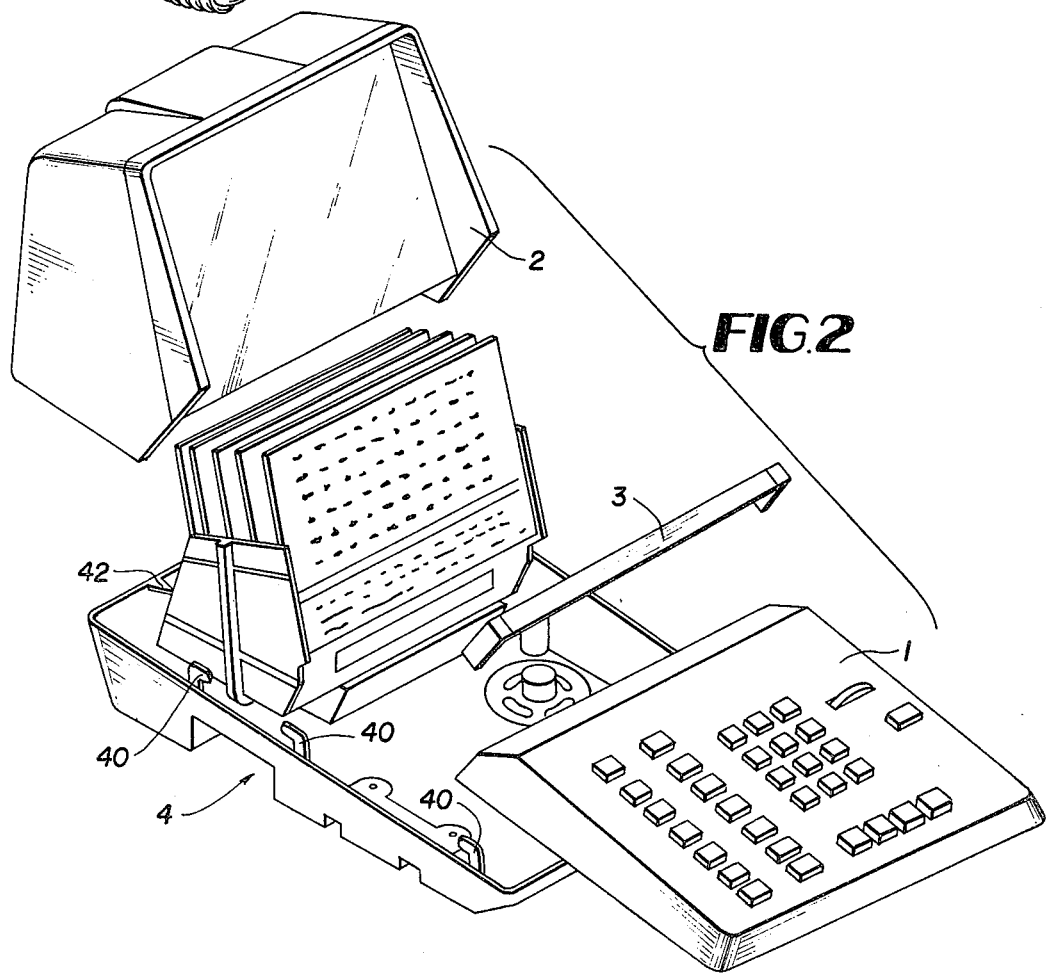
FIG. 2 is an exploded view of the apparatus of FIG. 1, illustrating the constituent parts of the console.

Turning first to FIG. 1, there is shown a desk console of generally conventional appearance, comprising a keyboard portion 1 and a display portion 2. In the angle defined by these two panels 1 and 2 is positioned the securing bar 3. The base of the desk console is indicated by the numeral 4 (FIGS. 2, 3). As can be gathered from FIG. 2, the keyboard panel indicated by the numeral 1 is made to be lifted from its normal position giving access to the parts normally covered by it. (These parts are not shown in FIG. 2, since they do not form part of the invention). The display portion is covered by a hood-shaped panel 2 the front of which is transparent.

Turning now to FIG. 3, there is seen that from the lateral walls of the base 4, which form a shallow tray, rise hook-like members 40 having a horizontal portion, the underside of which is a downwardly directed oblique shoulder 41. The panel, being an inverted tray has at two opposite lateral walls inwardly projecting brackets 11 having an oblique top side fitting the oblique shoulders 41. Similar brackets 21 are provided at two opposite walls of the hood-shaped panel 2.

At the rear wall of base 4 extends inwardly a point short spike 42 having an oblique underside. At the rear wall of the hood-shaped panel 2 is provided an eye 22, the web of which extends at an angle corresponding the obliquity of the underside of spike 42.

In order to assemble parts 1, 2, 3 and 4, first the panel 1 is placed on top of base 4—as indicated by arrows v, then it is slid forwardly as indicated by arrows w which results in brackets 11 slipping into mating engagement with members 40, the oblique shoulder 41 coming to lie on top of the bracket 11, whose obliquity matches the obliquity 41.

Now hood panel 2 is placed onto the base 4 as indicated by arrows x, whereupon it is pushed rearwardly as indicated by arrows y, bringing about mating interengagement of 21 with 41 and 22 with 42. Finally bar 3 is pressed into the space defined by the angle between the panels 1 and 2, urging panel 2 rearwardly in relation to base 4 and panel 1 forwardly in relation to the base. Due to the oppositely directed inclinations of the mating parts (11-41), (21-40) and (22-42), the panels are urged by the pressure or wedge action of bar 3 into even more intimate and secure inter-relative position.

What is claimed is:

1. In an apparatus having a base, at least two covering panels and means for securing such panels against relative displacement, the improvement wherein said means for securing comprise projections having oblique contact faces, wherein said base has parts which correspond to said projections to interengage matingly with said projections, and including an elongated, profiled member provided which in cross section defines an angle which corresponds with an angle at which said two panels extend relative to one another, said elongated member being wedgeably insertable between said two panels in space defined between them to exert pressure on said two panels urging said projections and said parts into mating position preventing disengagement.

2. In an apparatus according to claim 1, the apparatus being a desk console, wherein said base is a base structure, wherein one of said panels is at least one keyboard portion panel and wherein another of said panels is at least one display portion panel, said base structure being provided with at least one pair of female members, engaging members at said keyboard portion and at least one pair of like female members at said display portion, said covering panels for these parts of the console having enageable, male fastening means, which are to be receivably engageable by said female members, and wherein said elongated member is a bar-shaped member of a cross section to fit tightly in an angle ascribed by said covering panels provided for insertion into space between said panels defined by this angle.

3. In an apparatus as claimed in claim 2, wherein said female members at said base structure of the console offer for engagement downwardly directed oblique shoulders matching male connecting members at said panels which have correspondingly oblique top faces.

4. In an apparatus according to claim 2 or 3, wherein said engaging members are hook-shaped brackets.

* * * * *